UNITED STATES PATENT OFFICE.

CECIL O. PHILLIPS, OF NEW YORK, N. Y., ASSIGNOR TO THE AMERICAN COTTON OIL COMPANY, OF NEW YORK, N. Y., A CORPORATION OF NEW JERSEY.

TREATMENT OF COTTONSEED MEATS.

1,410,346.  Specification of Letters Patent.  Patented Mar. 21, 1922.

No Drawing. Application filed March 16, 1920, Serial No. 366,313. Renewed January 25, 1922. Serial No. 531,823.

*To all whom it may concern:*

Be it known that I, CECIL O. PHILLIPS, a citizen of the United States, residing at New York, in the county of New York, State of New York, have invented certain new and useful Improvements in the Treatment of Cottonseed Meats; and I do hereby declare the following to be a full, clear, and exact description of the invention, such as will enable others skilled in the art to which it appertains to make and use the same.

This invention relates to improvements in the treatment of cottonseed meats and in the extraction of oil and the production of cottonseed meal therefrom. The invention is based upon the discovery that the extraction of oil from cottonseed meats can be materially improved, and the cottonseed meats from which the oil is extracted, and the cottonseed meal produced therefrom, also improved, by cooking the ground meats in intimate admixture with a small amount of a solution of calcium chloride, and expressing the oil from the resulting cooked meats.

In the extraction of oil from cottonseed, as commonly practiced, the seeds are decorticated or hulled and the kernels or meats are separated from the hulls before the oil is extracted. The meats are then ground or crushed and reduced to a finely divided state and are then subjected to a cooking operation to promote the subsequent expression of the oil, after which the oil is expressed from the cooked meats under a heavy pressure. The extraction of the oil from the cottonseed meats in this way leaves a considerable amount of oil in the meats, commonly amounting to from 5 to 10%.

I have found that the amount of oil left in the meats can be appreciably reduced, and the amount of oil extracted correspondingly increased, by carrying out the cooking operation with a small amount of calcium chloride intimately combined with the ground meats, so that they are subjected to the action of the calcium chloride during the cooking operation. The cottonseed meal produced from the pressed cake is likewise improved by this treatment.

The calcium chloride may be advantageously added in the form of a solution of suitable strength which is intimately admixed with the meats before they are cooked. Various strengths of solution may be used, for example, solutions of 33% calcium chloride and 67% water, or 40% calcium chloride and 60% water, etc. With solutions of strengths such as those indicated the amount should not ordinarily be more than 5 or 6% based on the amount of meats treated, and it will usually be more advantageous to use a smaller amount so that the calcium chloride, for example, will be around 1% or even less of the weight of the meats treated, and of the meal produced.

In the practice of the invention, the seed may be decorticated and the meats crushed or ground in any suitable manner, such as is commonly employed for the purpose. The crushed meats may then be intimately mixed with the calcium chloride solution so that it will be uniformly and intimately distributed throughout the entire mass of the meats. The meats are then ready for the cooking operation which may likewise be carried out in common forms of cookers and which will vary somewhat, depending upon the nature of the meats and the conditions under which the cooking is carried out. The cooking period may thus vary from 15 to 40 minutes, and is commonly carried on in steam jacketed heaters with a steam pressure of from 20 to 100 pounds, and with appropriate agitation of the meats during the cooking.

The cooking operation is so modified by the added calcium chloride that the amount of oil which can be subsequently expressed is materially increased, and the recovery of the oil is otherwise promoted. One important advantage of the use of the calcium chloride solution is the possibility of adding and admixing with the meats a larger amount of moisture than could otherwise be satisfactorily used. It is thus possible, when calcium chloride is added, to obtain satisfactory pressing of the cooked meats with a total amount of moisture present which, without the calcium chloride, would preclude the satisfactory pressing of the meats. The calcium chloride solution appears to have a drying action upon wet meats; at least the apparent amount of moisture is not in many cases increased by the addition of the calcium chloride solution.

The process of the present invention is also of advantage for use in the treatment of meats or kernels where the natural moisture is insufficient. The use of the calcium chloride in a solution of proper strength enables the added moisture to be easily regulated, while the added moisture contains therein the calcium chloride which further contributes to the process.

Instead of adding the calcium chloride to the crushed meats before they are heated or cooked in the ordinary types of heaters used for that purpose, the calcium chloride can be added to the meats before they are ground or crushed, or even to the finely divided meats while they are being cooked, provided care is taken to bring about the proper degree of uniformity of admixture. Solutions of greater dilution than those referred to i. e., containing a smaller amount of the calcium chloride, can also be used, particularly where increased moisture is desirable in the meats and less calcium chloride in the meal.

It is a further advantage of the invention that the presence of the calcium chloride tends to prevent or retard evaporation, and loss of moisture during the cooking or heating operation.

It is a characteristic advantage of the invention that the cottonseed meal produced from the pressed cake is not only not injured by the treatment, but is materially improved in its properties, due to the modifying action of the calcium chloride during the cooking and pressing operation, and to the presence of the small amount of calcium chloride in a free or combined state in intimate admixture with the cotton seed meal produced. The resulting meal is thus of improved value for feeding purposes.

I claim:

1. The method of treating cottonseed meats, which comprises cooking the meats in intimate admixture with a small amount of calcium chloride, and expressing the oil from the cooked meats.

2. The method of treating cottonseed meats, which comprises intimately incorporating with the meats a solution of calcium chloride, subjecting the resulting meats to a cooking operation, and expressing the oil from the cooked meats.

3. The method of treating cottonseed meats, which comprises intimately admixing therewith a solution of calcium chloride and thereby increasing the moisture content of the meats beyond that which would be tolerated without the calcium chloride, subjecting the resulting meats to a cooking operation, and expressing the oil from the cooked meats.

4. An improved cottonseed cake or meal resulting from the cooking of cottonseed meats and the expression of oil from the cooked meats, said meats being intimately admixed before cooking with a small amount of calcium chloride which is present intimately admixed or combined with the resulting cake or meal.

In testimony whereof I affix my signature.

CECIL O. PHILLIPS.